United States Patent [19]

Lawson et al.

[11] 4,052,937

[45] Oct. 11, 1977

[54] PRINTING PLATE WATER SENSING MEANS AND METHOD

[75] Inventors: Leslie Edward Lawson, Orpington; John Sleeman Rogers; Peter Edward Watts, both of Reading, all of England

[73] Assignee: Vickers Limited, London, England

[21] Appl. No.: 597,989

[22] Filed: July 22, 1975

Related U.S. Application Data

[63] Continuation of Ser. No. 396,245, Sept. 11, 1973, abandoned.

[30] Foreign Application Priority Data

Sept. 12, 1972 United Kingdom ............... 42390/72

[51] Int. Cl.[2] ........................ B41L 25/02; B41M 1/06; G01N 21/48

[52] U.S. Cl. .................................... 101/147; 101/350; 101/451; 118/7; 356/211; 356/212

[58] Field of Search ............... 101/147, 148, 451, 349, 101/350; 356/209, 211, 212

[56] References Cited

U.S. PATENT DOCUMENTS

| | | | |
|---|---|---|---|
| 2,278,933 | 4/1942 | Kott | 250/219 |
| 2,773,412 | 12/1956 | Huck | 356/161 |
| 3,016,464 | 1/1962 | Bailey | 250/219 |
| 3,234,871 | 2/1966 | Ostwald | 101/142 |
| 3,412,677 | 11/1968 | Kantor | 101/148 |
| 3,439,175 | 4/1969 | Kammuller et al. | 250/218 |

FOREIGN PATENT DOCUMENTS

| | | | |
|---|---|---|---|
| 282,748 | 8/1952 | Switzerland | 101/348 |

*Primary Examiner*—Clyde I. Coughenour
*Attorney, Agent, or Firm*—Hopgood, Calimafde, Kalil, Blaustein & Lieberman

[57] ABSTRACT

The amount of water present on a lithographic printing plate during printing is determined by measuring the amount of water present on a surface which is other than that of the printing plate but which carries an amount of water related to the amount of water present on the printing plate. The surface upon which the measurement is made may be the surface of a control pad mounted on the printing roller in the gap between opposite ends of the printing plate, the surface of one of the rollers of the damp train applying water to the printing plate, or the surface of an auxiliary roller contacting one of the rollers of the damp train applying water to the printing plate. The amount of water subsequently applied to the printing plate may be regulated in dependence upon the amount of water determined as being already present on the printing plate.

8 Claims, 8 Drawing Figures

—F I G. 7—

PRINTING PLATE WATER SENSING MEANS AND METHOD

This is a continuation of copending application Ser. No. 396,245, filed Sept. 11, 1973.

This invention relates to printing and is concerned with damp measurement in lithographic printing.

According to one aspect of the present invention there is provided a method of determining the amount of water present on the surface of a printing plate during lithographic printing, which method comprises measuring the amount of water present on a surface which is other than the surface of the printing plate and which carries an amount of water related to the amount of water present on the surface of the printing plate.

According to another aspect of the present invention there is provided a lithographic printing machine comprising a printing roller for carrying a printing plate, a means of applying water to the surface of the printing plate, and a means of determining the amount of water present on the surface of the printing plate, said determining means being in the form of a damp measuring device arranged to measure the amount of water present on the surface of a part of the machine which is other than the printing plate and which is such that the amount of water present on the surface thereof is related to the amount of water present on the surface of the printing plate.

The term "printing plate" is used herein to mean any lithographic printing master carrying an image which is to be reproduced by lithographic printing.

The amount of water being applied to the surface of the printing plate during printing can be regulated in dependence upon the amount actually present as determined in accordance with the present invention. This can be effected manually or, alternatively, it can be effected automatically using a closed loop control system of the type generally described hereinafter.

In accordance with the present invention, the surface on which the measurement is made is not a part of the printing plate itself. Thus, the difficulties of measuring the amount of water present on different printing plates e.g. of different colours or having differently textured surfaces, is avoided. Further, the difficulty encountered in measuring the amount of water present on a plate which consists, to a large extent, of ink accepting regions rather than water-accepting regions is obviated.

The amount of water present on the surface may be determined by any suitable means. For example, the means of determining the amount of water present on the surface may be in the form of a damp measuring device comprising a means of directing radiation onto the surface and a means of detecting the amount of radiation reflected by the surface. The amount of radiation reflected is dependent on the amount of water on the surface. This technique of damp measurement is described hereinafter.

Advantages are obtained by carrying out damp measurements "off the printing plate" using reflectance techniques. "On the plate" measurement introduces problems due to the variation of the dry plate reflectivity and also the need to sample the amount of water once for each revolution of the plate. The principle of damp measurement by reflectance techniques depends upon the low reflectivity of the majority of printing plates and that, at low angles of incidence, water (i.e. the fountain solution applied to the plate) enhances the reflectivity of the plate. Even when the plate is dry a certain minimum reflectance will occur and hence a certan minimum signal will be given. This gives rise to an apparent damp level which is referred to as the dry plate level. The dry plate level varies from plate to plate and, more importantly, as the plate wears and becomes more reflective the dry plate level increases. The apparent damp level will therefore rise and under closed loop conditions (i.e. where the amount of water present as indicated by the damp measuring device is used to control the amount of water subsequently applied) the real level of damp becomes reduced resulting eventually in ink catch up. The apparent damp level is also influenced by the presence of ink on the plate. Thus, the measurement of damp must be made on an ink free portion of the plate. This involves sampling the damp at a suitable point and then holding the value for one revolution of the plate. Apart from being an added complication, this procedure restricts the closed loop control since the damp level produced on the plate by the water applying means can vary by as much as 20%. Thus, if this variation is averaged out over several revolutions of the plate, it limits the speed of response of the closed loop. By operating in accordance with certain embodiments of the present invention these problems can be In a first embodiment of the invention, the surface upon which the measurement is carried out is constituted by the surface of a control pad located in the gap formed when the printing plate is secured to the printing roller. In this location, the control pad does not fall within the normal printing zones of the machine but receives water from the water applying means for the printing plate in the same manner as does the printing plate. The pad rotates with the printing roller and the water film on the pad is reformed on each contact with the water applying means and thus the amount of water present on the pad depends upon the amount of water present on the water applying means which is also generating the water film on the printing plate surface. Thus, the amount of water present on the control pad is related to the amount of water present on the printing surface since they are each dependent upon the amount of water present on the water applying means. The surface of the control pad may be formed of any suitable hydrophilic material such as, for example, grained or grained and anodised aluminium. Although it is still necessary, in accordance with this embodiment to sample the damp in a single area and hold the value for one revolution, this embodiment does possess the advantage that it enables reflectance techniques to be used which are not ordinarily suitable for directly measuring the amount of water on smooth i.e. non-grained plates. Further, since it is not necessary for the surface of the pad and the surface of the actual printing plate to be identical in nature, the control pad can constitute a suitable standard surface having known properties and characteristics and thus variations in the surface of different printing plates do not introduce errors.

In use, the amount of water present on the surface of the control pad alone can be measured by the damp measuring device or, where practical, the amount of water present on both the control pad and also on the non-printing areas of the plate can be measured and compared. In the former case, where the damp measuring device measures reflectance, this enables a wide range of printing plates to be handled without having to make allowance for the different reflectance or absorbance characteristics of the various printing plates. Moreover, the construction and operation of the damp monitoring system is simplified. In the case where both the control pad and the non-printing areas of the plate are monitored, this is of particular use when printing plates of different materials are used such as paper plates or plates made of stainless steel or chromium.

In a second embodiment of the present invention, the surface on which the damp measurement is carried out is constituted by one of the rollers of the damping train. Normally the penultimate roller in the damping train i.e. the roller contacting the final moleton roller, is used. If reflectance techniques are to be used to measure the amount of water present, the roller on which the measurement is to be effected is provided with a suitable "rough" surface e.g. by being grained. In the case where only one final moleton roller is present, the damp level on the penultimate roller coming back from the final moleton roller will be similar to the damp level being applied to the printing plate by the final moleton roller. Thus, the amount of water present on the penultimate roller will be related to the amount of water present on the printing plate. In the case where reflectance techniques are used, the dry level value (corresponding to the case where no damp is present on the plate) is independent of the nature of the plate. Moreover, if the penultimate roller surface is hardened, the "dry" level value will be substantially constant since it will be unaffected by the wear of the plate and wear of the penultimate roller surface will have been virtually eliminated. Further, this embodiment enables tri-metallic and other highly reflective plates to be used in conjunction with a reflectance-type damp measuring device.

Moreover, in accordance with this embodiment, it is not necessary to sample the damp level in a single area and hold the value for one revolution. Thus, the damp level can be monitored continuously and averaged out over a single revolution without seriously affecting the response time of the closed loop. Further, since the damp measuring device is not mounted so that it monitors the printing plate itself, it is less likely to obscure the printing plate. Thus, the printer can see the plate in operation and does not need to remove the device to carry out routine operations such as washing the plate or changing the same. Also, in accordance with this embodiment, the damp measuring system can be readily incorporated in an existing conventional printing machine.

This embodiment is particularly relevant for printing machines including only one final moleton roller in cases where the level of damp present on the surface contacting the moleton depends primarily on the amount of water stored within the moleton and to a very much lesser degree on the initial condition of the surfaces before they enter the nip with the moleton. In the case where there are two final moleton rollers, the damp level returning on the penultimate roller will be less than the final damp level on the printing plate. Nevertheless, this damp level will be a measure of the damp level on the plate.

In a third embodiment, the surface upon which the measurement is carried out is constituted by the surface of an auxiliary roller which contacts one of the rollers of the damping train. The auxiliary roller has a hydrophilic surface and, in one form of this embodiment, the amount of water present on the auxiliary roller is determined by reflectance techniques.

The amount of water present on the auxiliary roller and also the amount of water present on the printing plate surface are dependent upon the amount of water being applied by the damp train and hence the amount of water on the auxiliary roller is related to that present on the printing plate surface.

If desired, the amount of ink present on the printing plate may be determined and the amount of ink subsequently applied may be controlled in dependence on the amount determined in accordance with our U.S. Pat. No. 3,857,095. In this way, the application of both water and ink in printing can be fully automated.

For a better understanding of the invention and to show how the same may be carried into effect, reference will now be made, by way of example, to the accompanying drawings, in which:

FIG. 1 is a perspective view of a printing roller of a printing machine in accordance with a first embodiment of the present invention, FIG. 2 is a schematic representation of a part of a printing machine including the roller of FIG. 1, FIG. 3 is a schematic representation of a part of a printing machine in accordance with a second embodiment of the present invention, FIG. 4 is a schematic representation of a part of a printing machine in accordance with a third embodiment of the present invention, and FIG. 5 shows a schematic representation of a part of a printing machine in accordance with the present invention and including a closed loop control system.

Figure 1:
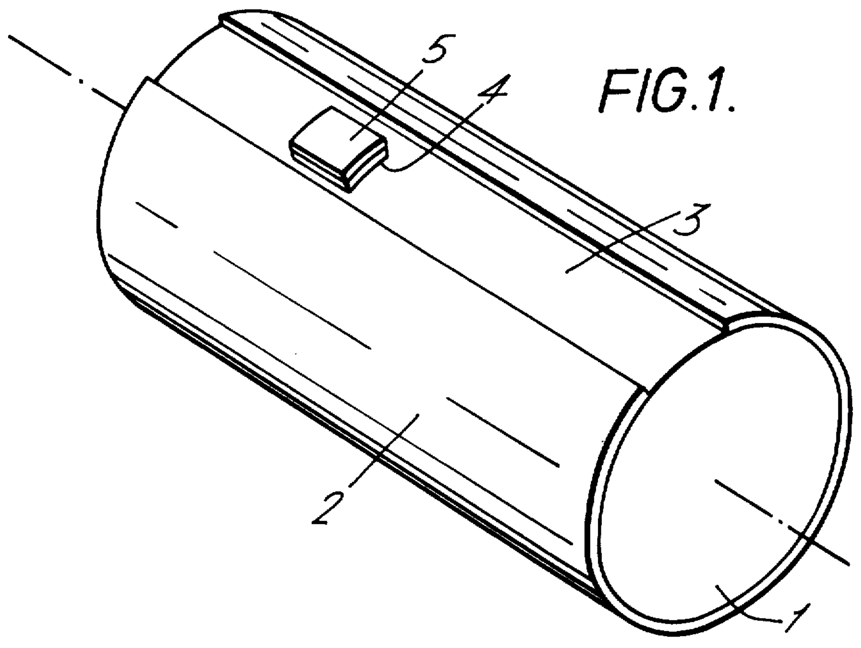

Referring to FIG. 1 of the drawings, there is shown a printing roller 1 carrying a printing plate 2 such that a gap 3 is formed between the opposite ends of the printing plate 2. A platform 4 is located in the gap and held to the roller 1 by retaining screws (not shown). The platform 4 includes retaining devices (not shown) to hold a pad 5 in the form of a small wear resistant anodised aluminium lithographic plate. The anodised aluminium is hydrophilic. The assembly is arranged so that the hydrophilic surface of the anodised aluminium 5 has the same radius of curvature as the surface of the printing plate 2 and so that the hydrophilic surface of the pad 5 and the surface of the printing plate 2 are equidistant from the rotational axis of the printing roller 1. The printing plate 2 is a marble-grained deep-etched zinc plate possessing several areas of typography.

Figure 2:
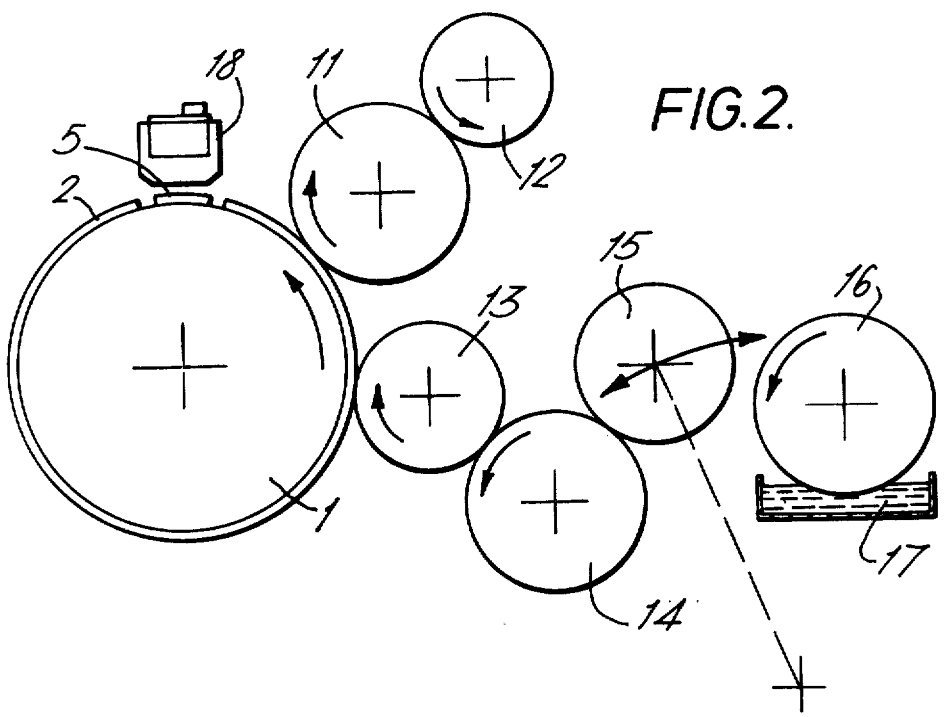

The printing roller 1 forms a part of a small single-colour sheet-fed lithographic off set printing machine partly shown in FIG. 2. The printing machine includes an inking means to supply ink to the printing plate 2 in operation. The inking means is represented schematically by an inking roller 11 and an ink feed roller 12. In addition, the printing machine includes a means for applying water to the plate 2 and comprising a damping roller 13, a geared distributor roller 14, a reciprocating ductor feed roller 15 and a fountain roller 16 which is partially immersed in an aqueous fountain solution 17 contained in a reservoir. The rollers rotate in the direction indicated by the arrows. The measuring head 18 of a damp measuring device is mounted adjacent the printing roller 1 so that it is in registry with the control pad 5 during each revolution of the printing roller 1. The measuring head comprises a means for directing radiation onto the pad 5 at a given angle of incidence and a means for detecting the amount of radiation reflected by the pad in a particular direction. The detector maybe, for example, a phototransistor which effectively produces a current carrying capability which depends on the amount of light striking the phototransistor. The amount of light reflected from the control pad 5 is dependent upon the amount of water on the pad 5. Essentially, the device is as described hereinafter. The signal produced by the detector is operably connected to the water applying means so that the quantity of fountain solution 17 applied to the printing plate 2 is solely dependent upon the amount of damp detected on the control pad 5 by the device. This is effected by connecting the device, by suitable circuitry (not shown) to a servo motor (not shown) which is geared to the feed roller 15, the servo motor being started and stopped in dependence upon the amount of water present on the control pad 5 as determined by the device. The machine includes an automatic paper feeding device (not shown).

In an experiment, the printing machine was primed with a commercial litho-off set black ink and the automatic paper feeding device was loaded with a supply of suitable coated paper. The fountain solution 17 was a normal aqueous solution comprising 10 cc of "Pirafount" diluted with 1 litre of tap water. After starting the machine and the damp control system, the water applying means was automatically primed with the quantity of fountain solution required to moisten the control pad 5 to the degree to which the control system had previously been set. The non-printing regions of the printing plate were concurrently moistened by the water applying means. When the required level of damp on the printing plate had been reached, (as determined by the damp level measured on the pad 5 by the damp measuring device) the device automatically stopped the supply of further water. Once this level had been reached, ink was applied to the printing plate 2 by the rollers 12 and 11 and the paper feeding device was actuated. After only a few sheets of paper had been consumed, very good copies of the typography were obtained on the coated paper. No visual assessment, or manual adjustment of the quantity of damp being applied, was carried out. With the printing machine operating in this manner, and the damp measuring device measuring and controlling the amount of damp applied, printing continued without difficulty. Other than topping up the reservoir for the fountain solution and adjusting the supply of ink in the normal manner, the operator merely supervised the machine and within half an hour more than 1500 satisfactory copies had been obtained. During the whole of this time, the control pad 5 enabled the damp measuring device to accurately control the replenishment of the water as it evaporated and as it was absorbed by the paper and ink.

Figure 3:
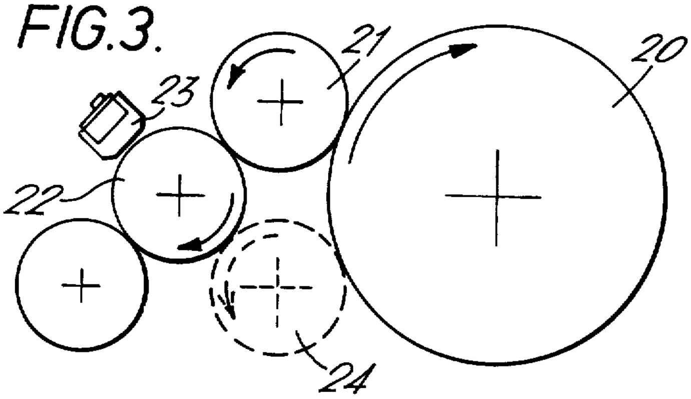

Although in this embodiment the damp measuring device is described in relation to a small single colour press, it will be appreciated that it may be incorporated in any lithographic press. Referring to FIG. 3, the printing machine comprises a printing roller 20 carrying a printing plate (not shown). The printing machine also includes a means of applying water to the printing plate comprising a train of damping rollers terminating in a final moleton roller 21. The penultimate roller 22 in the damp train is grained and is continuously monitored by the measuring head 23 of a damp measuring device. The direction of rotation of the rollers is as indicated by the arrows. The damp measuring device is of the type described hereinafter and measures the amount of light reflected from the penultimate damp roller 22 which is dependent upon the thickness of the water film on that roller. The thickness of that film depends primarily on the amount of damp stored within the final moleton roller 21 and the amount of water present on the printing plate on the printing roller 20 is similarly dependent upon the amount of water stored within the moleton roller 21. Thus, the amounts of water on the penultimate roller 22 and on the printing plate on the roller 20 are related. As previously described, the amount of water determined on the penultimate roller 22 by the damp measuring device can be used to control automatically the amount of water being applied by the damp train.

A second final moleton roller 24 may be included. In this case also, the level of water as determined on the penultimate roller 22 by the dammp measuring device will be a measure of the amount of water present on the printing plate.

Figure 4:
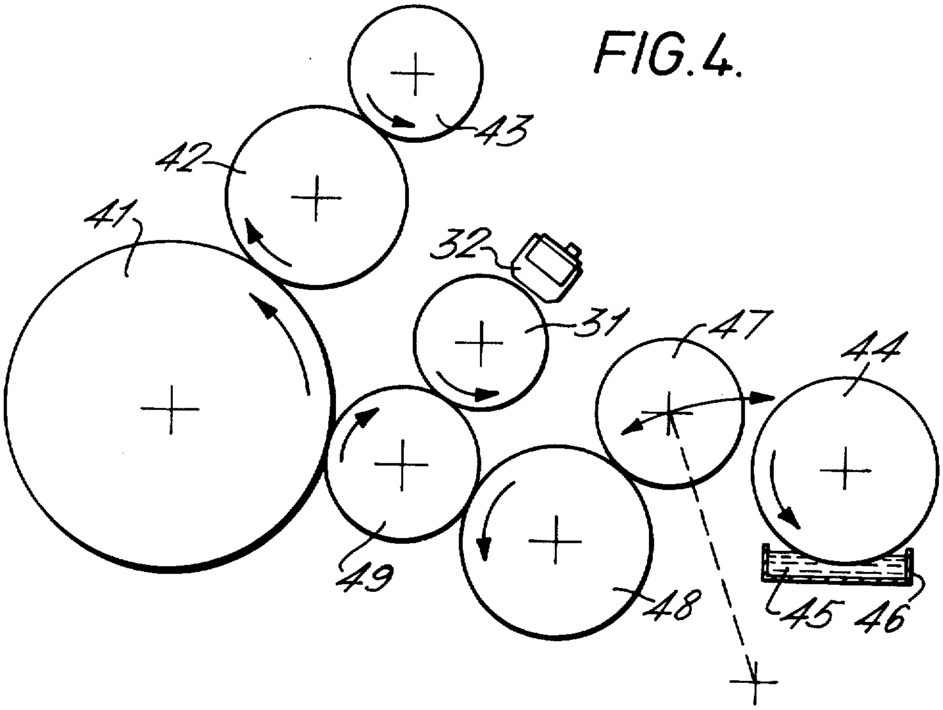

Referring to FIG. 4, there is shown a printing machine including a printing roller 41, adapted to carry a printing plate (not shown). A means of applying ink to the printing plate is provided. The ink applying means is represented schematically by an inking roller 42 and an ink feed roller 43. A water applying means is provided comprising a fountain roller 44 partially immersed in aqueous foutain solution 45 held in a reservoir 46, a reciprocating ductor roller 47 to feed fountain solution from the fountain roller 44 to a geared distributor roller 48, and a plate damping roller 49 to transfer fountain solution from the geared distributor roller 48 to the printing plate on the printing roller 41. The printing machine includes an auxiliary roller 31 which is driven by the damping roller 49. The direction of rotation of the rollers is as indicated by the arrows. Mounted on the roller 31 is the measuring head 32 of a damp measuring device of the type described hereinafter.

In use, the amount of water present on the auxiliary roller 31 and the amount of water present on the printing plate on the printing roller 41 are both dependent upon the amount of water present on the damping roller 49 and are related. Thus, the amount of water present on the auxiliary roller 31 as determined by the damp measuring device is a measure of the amount of water on the printing plate on the printing roller 41.

Figure 5:
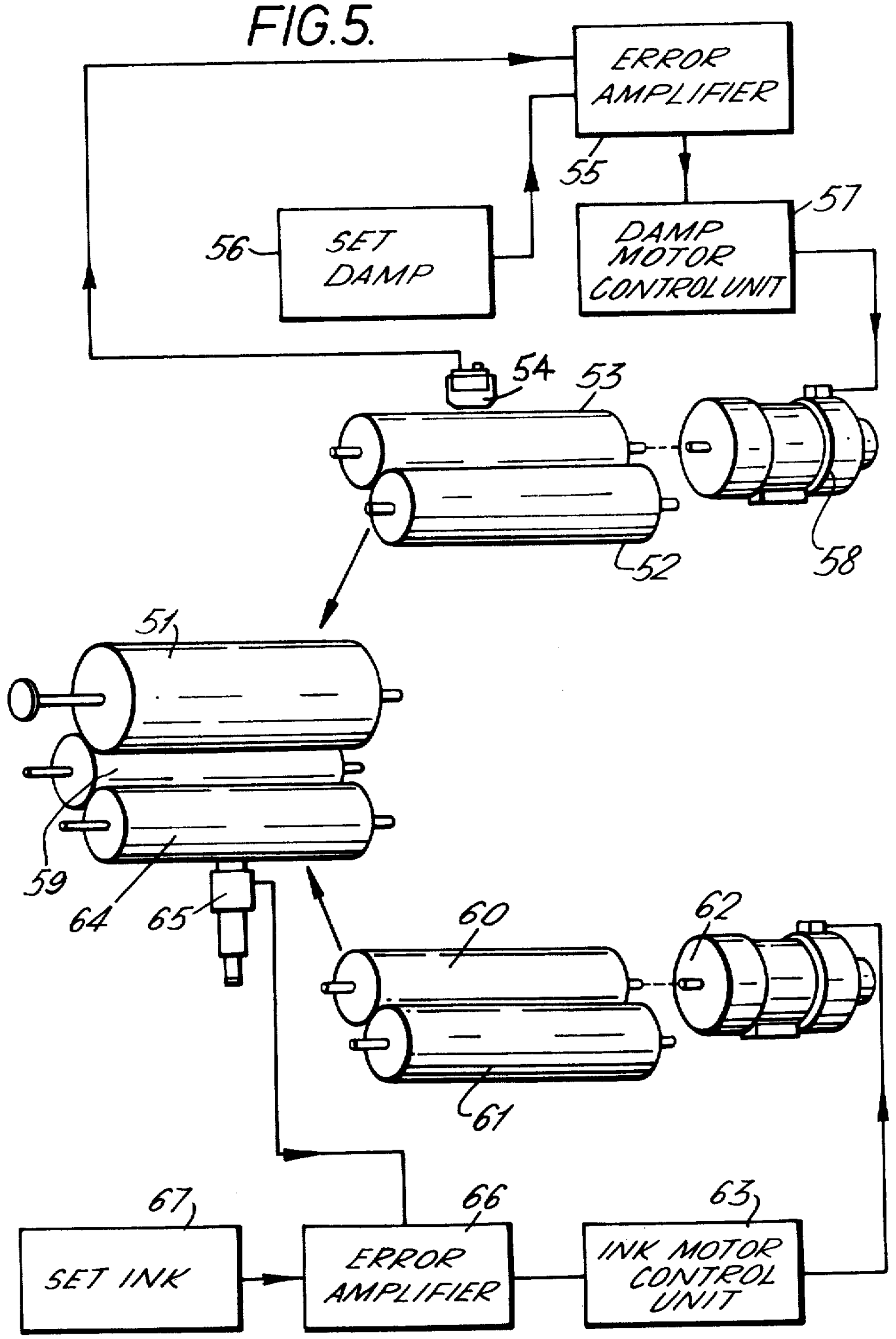

Referring to FIG. 5, the printing machine comprises a driven printing roller 51 carrying a printing plate (not shown). A means is provided to apply water to the printing plate on the roller 51. This comprises a damp train driven by the roller 51 and terminating in a damping roller 52 in contact with the printing plate. The penultimate roller 53 of the damp train is a grained roller and is associated with the measuring head 54 of a damp measuring device of the type described hereinafter to determine the amount of water present on the roller 55 by measuring the variation in light reflectance. The signal from the measuring head 54 is fed into an amplifier 55. There is also provided a means 56 of generating a reference signal dependent upon the amount of water which it is desired to be present on the printing plate. This reference signal is also fed into the amplifier 55. The amplifier 55 compares the signals and causes a motor control unit 57 to vary the speed of a motor 58 driving a roller of the damp train in dependence upon the difference in signals so that should the damp measuring device indicate that too little water is present on the roller 53 (and hence on the printing plate) then the speed of the motor 58 is adjusted so that more damp is applied by the damp train rollers, and vice-versa.

The machine also includes a means of applying ink to the printing plate on the printing roller 51. This means comprises an inking roller 59 and a train of rollers to feed ink to the inking roller 59. The ink roller train includes rollers 60 and 61, the remainder of the ink train rollers being omitted in the interests of clarity. The roller 60 is driven by a variable speed motor 62. A control unit 63 is provided to regulate the speed of the motor 62. Ink is applied to the inking roller 59 by the ink train rollers via an electrically conductive roller 64 in contact with the inking roller 59. A device 65 for measuring the thickness ofthe ink on the roller 64 is provided. This device is of the type described in our United States Patent No. 3,857,095 and includes a coil effectively supported by a cushion of gas at a constant distance from the surface of the ink film on the roller 64 and hence at a distance, from the surface of the roller 64, which varies in dependence on the thickness of the ink film. This variation in distance produces a change in inductance of the coil and thus the inductance is a measure of the ink film thickness. The printing machine includes a means operably connecting the device 65 with the control unit 63 to cause the control unit 63 to regulate the speed of the motor 62 in dependence upon the amount of ink present on the roller 64 (and hence on the printing plate of the roller 51) as determined by the device 65. This means comprises an amplifier 66 and a means 67 of transmitting a reference signal to the amplifier 66. The reference signal is set so that the thickness of the ink film on the roller 64 is such that the ink film thickness on the printing plate is as desired. The amplifier 66 receives a signal from the device 65 which is dependent upon the thickness of the ink film on the roller 64 and compares this signal with the reference signal from means 67. The amplifier 66 then causes the control unit 63 to vary the speed of the motor 62 in dependence upon the difference between the signals so that should the device 65 indicate that too little ink is present the speed of the motor 62 is adjusted so that more ink is applied by the ink train rollers and vice-versa. Thus, in accordance with this embodiment, both the amount of ink and the amount of water present on the printing surface during printing are continuously monitored and the amounts of water and ink subsequently applied are automatically controlled in accordance with the monitored values.

Figure 6:
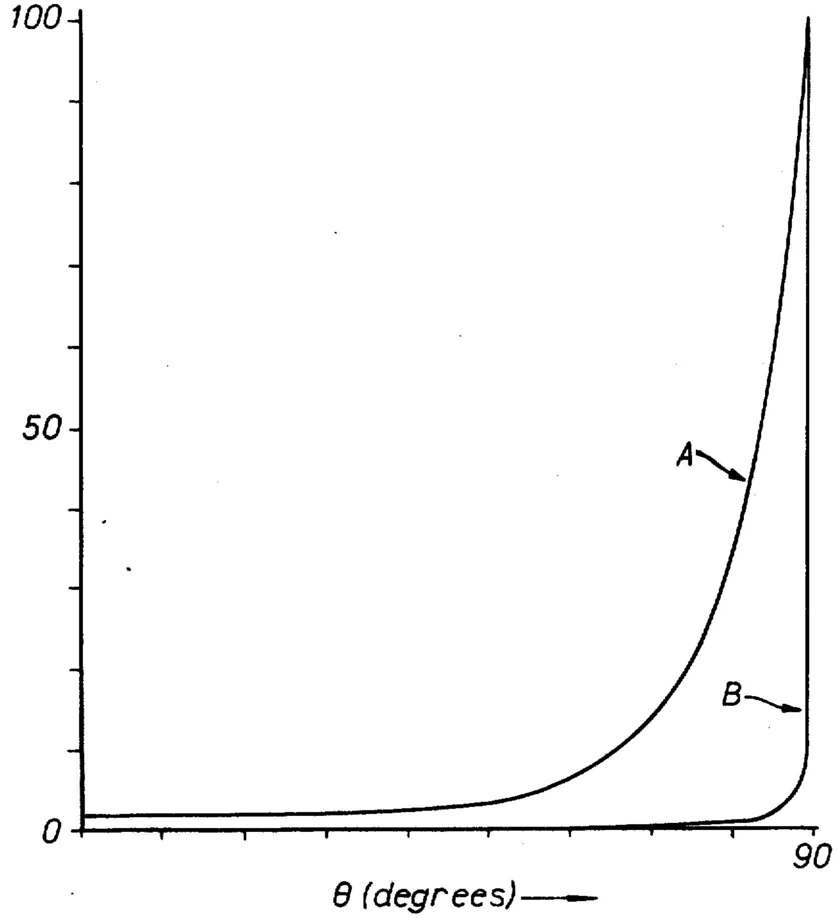
FIG. 6 is a graph consisting of two curves showing the variation in reflectivity of water and of an anodised aluminium surface in dependence on the angle of incidence of radiation, percentage of intensity reflected being plotted as ordinate and angle of incidence ($\theta$) being plotted as abscissa.

The reflectivity of any surface is a function of the angle of incidence ($\theta$) and increases with increasing angle of incidence from a lower value at small angles of incidence to 100 percent at an angle of incidence of 90°. Curve A of FIG. 6 shows the variation of the reflectivity of water with angle of incidence and this curve is typical. The reflectivity of a surface is also affected by the texture of the surface and a large amount of radiation is scattered from a rough surface. The surface of an anodised lithographic printing plate has a very fine surface roughness, somewhat akin to the effect produced by sand blasting, and hence the regular reflection from such a printing plate is considerably reduced as a result of diffuse scattering. Curve B of FIG. 6 shows the variation of the reflectivity of an anodised aluminium surface with angle of incidence. If a thin film of liquid is present on the plate, this will partially fill the minute imperfections in the plate and hence the reflectivity of radiation at a suitable angle of incidence will be increased. Thus, when the imperfections in the plate are completely covered by a film of liquid, the reflectivity reaches a limiting value equal to the reflectivity associated with a liquid surface at the given angle of incidence. As the film of liquid becomes thinner, the reflectivity falls steadily until it reaches a minimum at the point where the plate surface is dry. By measuring the amount of radiation reflected by the roughened surface wet with the liquid at a given angle of incidence a measure of the amount of liquid present on the surface can be obtained and the amount of liquid on the surface can then be adjusted as desired in order to obtain optimum printing results. The thickness of the film of water on the surface of a lithographic printing plate lies within the range of the surface roughness for acceptable printing results.

An optimum angle of incidence can be chosen by plotting the reflectivity of the liquid against the angle of incidence as shown in curve A of FIG. 6 and by plotting the reflectivity of the plate against angle of incidence as shown in curve B of FIG. 6. It can be seen that at low angles of incidence, direct reflection from the roughened surface is virtually non-existent but that the reflectivity begins to increase at a certain angle of incidence. Once this occurs, the ratio of the reflection from the wet surface to the dry surface begins to diminish. Maximum sensitivity occurs at an angle of incidence just below the value at which the reflectivity of the anodised aluminium plate begins to increase.

Figure 7:
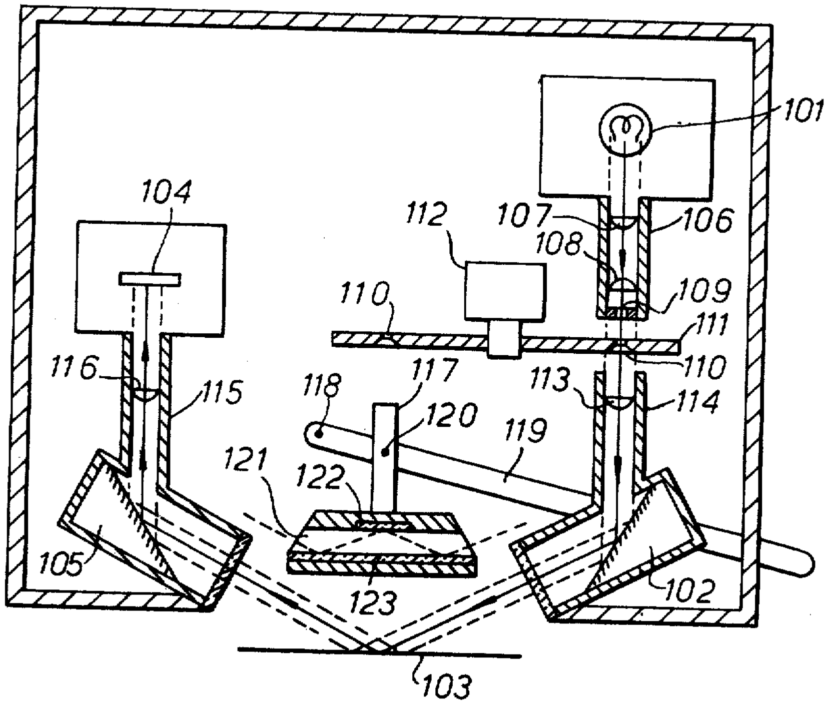
FIG. 7 shows schematically a measuring head for sensing the reflectivity of a surface.

FIG. 7 diagrammatically shows a measuring head of an apparatus for measuring the wetness of a printing surface. The head comprises a light source 107 arranged to direct a beam of light on to a mirror 102 which reflects the light on to the printing surface 103, e.g. of an anodised aluminium printing plate of a printing cylinder. The apparatus also includes a detector 104 to receive light reflected from the printing surface 103 via a second mirror 105. The light from the source 101 passes through a tube 106 containing a collimating lens 107 and a lens 108 which focuses the light onto an aperture 109. The light passes from the aperture 109 through apertures 110 in a chopper disc 111 driven by an electric motor 112 so that the light is transmitted from the chopper disc at a frequency of 100 c/s. The chopped light transmitted by the disc 111 then passes through a lens 113 in a tube 114 before striking the mirror 102. Light reflected from the printing surface 103 strikes the mirror 105 and then enters the detector 104 via a tube 115 containing a focusing lens 116. The light source 101 is a quartz halogen 12 volt 55 watt bulb. The detector 104 may be coupled to a circuit responsive substantially only to the alternating component of the signal produced by the detector 104 to discriminate against any stray light. Moreover, filters may optionally be incorporated into the chopper disc 111 so that distinct bands of radiation can be discriminated against if desired. The lens 113 focuses light onto the printing surface 103 to restrict the size of the light spot on the printing surface 103. This restricts the amount of scattered light which will reach the detector 104 and also defines accurately the area of the printing surface 103 being examined. The tube 115 also eliminates much of the scattered light. In this embodiment, it is important that directly reflected light, rather than diffusely scattered light, is detected by the detector 104. The mirrors 102 and 105 enable the profile presented by the apparatus to the printing surface to be kept small while still directing light onto the printing surface at an optimum angle of incidence.

A standard is also provided for the measurement, and in one case this can be achieved by reflecting light from the surface 103 when dry, thereby to obtain the response of the apparatus to a dry surface for comparison with the results for a wet surface.

FIG. 7 shows how another form of standard may be provided. The standard is defined by a member 117 mounted for vertical movement, achieved by rotating about a fixed axis 118 a lever 119 pivoted to the member 117 at 120. The member 117 comprises a passage 121 to intercept the light from mirror 102 when the member 117 has been lowered. The opposite walls of the passage have glass plates 122 and 123 arranged so that light from mirror 102 will strike plate 123 twice and plate 122 once. The three reflections give a reflectivity corresponding to a certain, standard, amount of wetness. The path of the light through the passage 121 when the member 117 has been lowered is illustrated in FIG. 7 by dashed lines.

Figure 8:
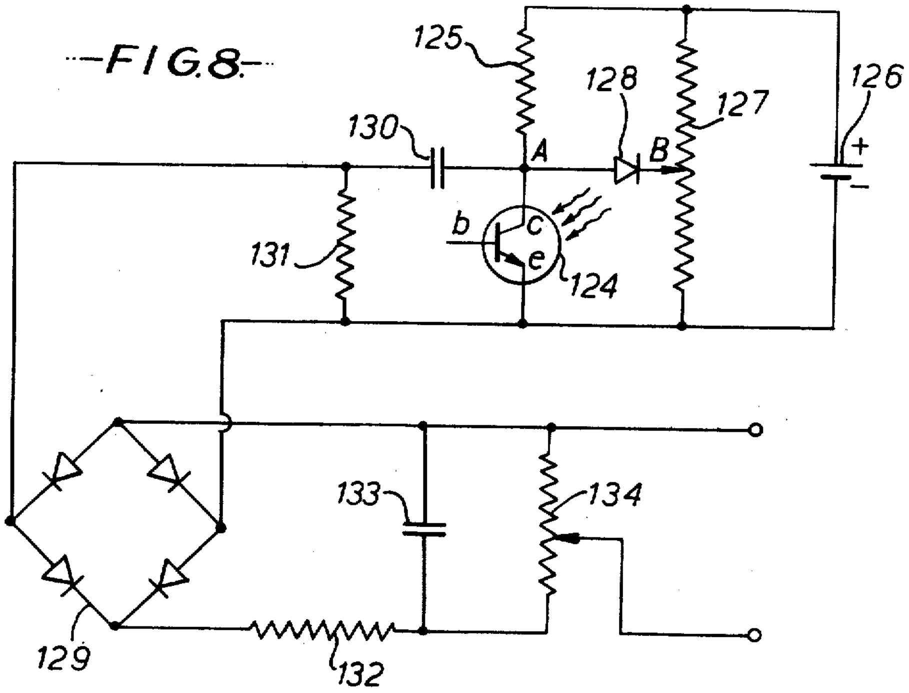
FIG. 8 shows the circuit diagram for the measuring head shown in FIG. 7.

One embodiment of electrical circuit for the detector 104 is shown in FIG. 8. The detector in this case is a BPX 29 photo transistor 124 which effectively produces a current carrying capability which depends on the level of light striking it. The photo transistor 124 is connected in series with a 160 kilohm load resistor 125 and a 30 volt source of potential 126. A variable 10 kilohm resistor 124 is connected in parallel with the photo transistor 124 and load resistor 125 and a diode 128 is provided to electrically connect point A in the circuit between the photo transistor 124 and the local resistor 125 to the tap of the variable resistor 127. Point A is electrically connected to one input side of a bridge rectifier 129 through a 2.2 μ f capacitor 130. The emitter of the photo transistor 124 is connected to the other input side of the rectifier 125 and there is a one megohm resistor 131 bridging the two input sides of the rectifier 129. The output sides of the rectifier 129 are connected to a chart recorder (not shown) via a 470 kilohm resistor 132, a 2.2 μ f capacitor 133, and a variable one kilohm resistor 134 to tap off a suitable fraction on the output of the rectifier 129 to display the same on the chart recorder.

In use of the apparatus, light is shone from the light source 101 via tube 106, chopper disc 111, lens 113 and mirror 102 so that chopped light is directed onto the dry printing surface 103 (or onto the standard device 117) at the optimum angle of incidence. The reflected chopped light is then guided to the photo transistor 124. The current carrying capability of the photo transistor 124 varies as a result of this incident light and a voltage drop across the load resistor 125 is produced. The potential at A thus varies at the chopper frequency. The variable resistor 124 is then adjusted so that for the amount of light striking the photo transistor 124 from the dry printing surface 103 (or from the standard member 117), the potential at point B is always lower than or equal to the potential at point A. In effect, A is held at the same potential as B with the result that no alternating signal is produced by the circuit. Hence the rectifier 129 produces no output with the result that nothing is recorded on the chart recorder. Having thus set up the apparatus, the apparatus is then used to detect reflected light from the printing surface when wet with the liquid (e.g. water). Because of the presence of the liquid on the printing surface 103, the amount of reflected radiation increases and hence the potential at point A drops below the potential at point B. As a result, an alternating signal is fed to the rectifier 129 at the chopper frequency. A suitable fraction of the output of the rectifier 129 is tapped off across the variable resistor 134 and displayed on the chart recorder. The output on the chart recorder is a direct measure of the amount of liquid on the printing surface 103. The information on the chart, or the signal fed thereto, will be used to control the amount of liquid fed to the printing surface 103.

We claim:

1. A method of determining the amount of water present on the surface of a printing plate during lithographic printing, which method comprises directing radiation only onto another surface which is separated from the surface of the printing plate and which carries an amount of water related to the amount of water present on the surface of the printing plate, said other surface being grained to an extent to provide surface irregularities which will be incompletely filled by the amount of water desired on the printing plate, whereby variations in the amount of water present will vary the reflectivity of said other surface, and detecting the amount of radiation reflected from said other surface to obtain a measure of the amount of water present on the surface of the printing plate.

2. A method according to claim 1, wherein the amount of water applied to the surface of the printing plate during printing is controlled in dependence on the measured amount of water present on said surface other than the printing plate surface.

3. A lithographic printing machine comprising a printing roller, a printing plate mounted thereon having a printing surface, means for applying water to the printing surface of the printing plate, a part of said machine which is separated from said printing plate having a surface which carries an amount of water related to the amount of water present on the printing surface, said part of the machine having a surface which is grained to an extent to provide surface irregularities which will be incompletely filled by the amount of water desired on the printing plate, whereby variations in the amount of water present will vary the reflectivity of said part, and a damp measuring device comprising a means for directing radiation only onto said surface of said part, and means for detecting the amount of radiation reflected by said surface of said part to provide a measure of the amount of water present on said surface of said part and hence on said printing surface.

4. A printing machine as claimed in claim 3, wherein the printing plate is mounted on the printing roller so that a gap is formed between opposite ends of the printing plate, and a control pad located in the gap, said control pad constituting said part of the machine.

5. A printing machine as claimed in claim 3, wherein the means of applying water to the surface of the printing plate comprises a train of damping rollers and wherein said part of the machine is one of the damping rollers.

6. A printing machine as claimed in claim 5, wherein said one of the damping rollers is the penultimate roller of the train.

7. A printing machine as claimed in claim 3, wherein the means of applying water to the surface of the printing plate comprises a train of damping rollers and wherein said part of the machine is an auxiliary roller in contact with one of the rollers of the damping train.

8. A printing machine as claimed in claim 3, wherein the damp measuring device includes means for producing a signal in dependence on the amount of water present on the surface of said part of the machine, the machine additionally including a control means operably connected to the means for producing a signal and to the means for applying water to the surface of the printing plate to control the amount of water applied to the surface of the printing plate in dependence on said signal.

* * * * *